United States Patent
Hart et al.

[11] Patent Number: 5,815,395
[45] Date of Patent: Sep. 29, 1998

[54] DIAGNOSTIC METHOD AND APPARATUS FOR CONFIGURATION ERRORS

[75] Inventors: Drew R. Hart; Richard C. McCray, both of Columbus; Kenneth W. Kreager, Mt. Sterling, all of Ohio

[73] Assignee: Interface Definition Systems, Inc., Columbus, Ohio

[21] Appl. No.: 496,334

[22] Filed: Jun. 29, 1995

[51] Int. Cl.⁶ .................................................. G05B 19/18
[52] U.S. Cl. .............................. 364/468.17; 364/468.14; 395/229
[58] Field of Search ..................... 395/600, 157, 395/500, 207, 228, 229; 364/401, 468, 403, 402, 552, 476.05, 490, 468.13, 468.14, 468.15, 468.16, 468.17; 371/16.1

[56] References Cited

U.S. PATENT DOCUMENTS

| | | | |
|---|---|---|---|
| 4,591,983 | 5/1986 | Bennett et al. | 364/403 |
| 4,847,761 | 7/1989 | Ferriter et al. | 364/401 |
| 4,862,376 | 8/1989 | Ferriter et al. | 364/468 |
| 4,888,771 | 12/1989 | Benignus et al. | 371/16.1 |
| 5,119,307 | 6/1992 | Blaha et al. | 364/468 |
| 5,191,534 | 3/1993 | Orr et al. | 364/468 |
| 5,197,001 | 3/1993 | Mukherjee | 364/403 |
| 5,210,686 | 5/1993 | Jernigan | 364/403 |
| 5,260,866 | 11/1993 | Lisinski et al. | 364/401 |
| 5,307,261 | 4/1994 | Maki et al. | 364/401 |
| 5,311,424 | 5/1994 | Mukherjee et al. | 364/401 |
| 5,317,729 | 5/1994 | Mukherjee et al. | 395/600 |
| 5,434,791 | 7/1995 | Koko et al. | 364/468.14 X |

*Primary Examiner*—Reba I. Elmore
*Assistant Examiner*—Brian C. Oakes
*Attorney, Agent, or Firm*—Frank H. Foster; Kremblas, Foster, Millard & Pollick

[57] ABSTRACT

Metric values derived from levels of indenture are used by producers to address statistically critical errors effecting producibility. The invention provides a machine implemented diagnostic method for determining the severity of an initial failure, predicts the severity of side effects of the failure and its correction, and gauges the overall effect the failure has on producibility.

13 Claims, 13 Drawing Sheets

BILL OF MATERIAL

```
TOP ASSEMBLY
  |  |
  |  --SUBASSEMBLY NO. 1
  |       |  |
  |       |  --COMPONENT NO. 1
  |       |
  |       -- COMPONENT NO. 2
  |
  --SUBASSEMBLY NO. 2
        |  |
        |  --COMPONENT NO. 3
        |
        --COMPONENT NO. 4
```

INDENTED DRAWING LIST

| INDENTED LEVEL | | | | DRAWING NUMBER | TITLE |
|---|---|---|---|---|---|
| 1 | 2 | 3 | 4 | | |
| X | | | | 123456 | TOP ASSEMBLY |
| | X | | | 234567 | SUBASSEMBLY NO. 1 |
| | | X | | 345678 | COMPONENT NO. 1 |
| | | X | | 456789 | COMPONENT NO. 2 |
| | X | | | 567890 | SUBASSEMBLY NO. 2 |
| | | X | | 678901 | COMPONENT NO. 3 |
| | | X | | 789012 | COMPONENT NO. 4 |

*TREE REPRESENTATION
OF A BILL OF MATERIAL*

*FIGURE 4A*

INDENTED STRUCTURE LIST

| Record Number | Level Number | Instance Name | Type Name | Attribute Field |
|---|---|---|---|---|
| 01 | 0 | BR549 | SCOPE | |
| 02 | 1 | NCC1701 | CONTRACT | C:\DATA\CONTRACT\NCC1071.CON |
| 03 | 2 | X9401 | WORKORDR | |
| 04 | 3 | DRVX49 | DESGNDOC | C:\DATA\DESIGN\DRVX49.DES |
| 05 | 4 | DQ73B6 | QAREVDOC | C:\DATA\QA\DQ73B6.QAR |
| 06 | 5 | PURCHASE | DEPTPROC | C:\PROC\PURCHASE\OPMANUAL.DPT |
| 07 | 6 | GLUE | VPN | Q478X; ABC Corp. |
| 08 | 6 | CARD | VPN | 8FGD4; BCD Corp. |
| 09 | 6 | SPRING | VPN | PSWS6; CDE Corp. |
| 10 | 6 | BATTERY | VPN | PLMK8; DEF Corp. |
| 11 | 6 | BOARD | VPN | NHY66; EFG Corp. |
| 12 | 5 | ASSEMBLY | DEPTPROC | C:\PROC\ASSEMBLY\OPMANUAL.DPT |
| 13 | 6 | ACKBLEH7 | PCKGDES | C:\DATA\PCKGDES\ACKBLEH7.PCK |
| 14 | 7 | PURCHASE | DEPTPROC | C:\PROC\PURCHASE\OPMANUAL.DPT |
| 15 | 8 | CARTON | VPN | JASDJ4; FGH Corp. |

FIGURE 4B

INDENTED STRUCTURE LIST

| Record Number | Level Number | Instance Name | Type Name | Attribute Field |
|---|---|---|---|---|
| 16 | 8 | PALLET | VPN | HDH332; GHI Corp. |
| 17 | 8 | SHRNKWRP | VPN | 3DLK53; HIJ Corp. |
| 18 | 6 | B7XC4F | FLLAYOUT | C:\DATA\ASSEMBLY\B7XC4F.SFL |
| 19 | 7 | F783MSS | STGNGPRC | C:\DATA\ASSEMBLY\F783MSS.STG |
| 20 | 7 | XZSAQ23 | CARDPROC | C:\DATA\ASSEMBLY\XZSAQ23.CRD |
| 21 | 8 | CHSH333 | MACHOPS | C445 |
| 22 | 9 | 8FGD4 | CARDS | |
| 23 | 7 | FS23MSS | GLUEPRC | C:\DATA\ASSEMBLY\FS23MSS.GLU |
| 24 | 8 | X47BB | MACHOPS | C745 |
| 25 | 9 | Q478X | GLUE | |
| 26 | 8 | JSDJ3 | MACHOPS | C321 |
| 27 | 9 | PSWS6 | SPRING | |
| 28 | 10 | GSC | SUBASSEM | |
| 29 | 7 | FKSSD | B&BPROC | C:\DATA\ASSEMBLY\FKSSD.B&B |
| 30 | 8 | GSGD11 | MACHOPS | C321 |

*FIGURE 4C*

INDENTED STRUCTURE LIST

| Record Number | Level Number | Instance Name | Type Name | Attribute Field |
|---|---|---|---|---|
| 31 | 9 | GSC | SUBASSEM | |
| 32 | 9 | PLMK8 | BATTERY | |
| 33 | 9 | NHY66 | BOARD | |
| 34 | 10 | GSCBB | SUBASSEM | |
| 35 | 7 | K3ASP | DRYRPROC | C:\DATA\ASSEMBLY\K3ASP.DRY |
| 36 | 8 | YY322 | MACHOPS | C73 |
| 37 | 9 | GSCBB | SUBASSEM | |
| 38 | 7 | JJKS31 | TESTPROC | C:\DATA\ASSEMBLY\JJK311.TST |
| 39 | 8 | DH553M | QAREQS | C:\DATA\QA\DH553M.QAR |
| 40 | 9 | GSCBB | SUBASSEM | |
| 41 | 10 | BR549 | PRODUCT | |
| 42 | 10 | GSCBB | QAREJECT | |
| 43 | 7 | LKJH77 | PCKGPRC | C:\DATA\ASSEMBLY\LKJH77.PPR |
| 44 | 8 | YHDD4 | MACHOPS | C34 |
| 45 | 9 | BR549 | PRODUCT | |

FIGURE 4D

INDENTED STRUCTURE LIST

| Record Number | Level Number | Instance Name | Type Name | Attribute Field |
|---|---|---|---|---|
| 46 | 9 | JASDJ4 | CARTON | |
| 47 | 10 | BR549 | BOXED | |
| 48 | 7 | H888QQ | STORPROC | C:\DATA\ASSEMBLY\H888QQ.STR |
| 49 | 8 | BR549 | BOXED | |
| 50 | 8 | HDH332 | PALLET | |
| 51 | 8 | 3DLK53 | SHRNKWRP | |
| 52 | 9 | BR549 | DELIVER | |

FIGURE 5

THE TYPE DATA STORE

TYPE NAME:    PHLPSCRW
USAGE:         PHILLIPS-HEAD SCREWS
ATTRIBUTES:   SCREW LENGTH (INCHES), THREADS PER INCH, HEAD SIZE (INCHES)

FIGURE 6

THE INSTANCE DATA STORE

INSTANCE NAME:   SHEETMTL
TYPE NAME:        PHLPSCRW
USAGE:            SHEET METAL PHILLIPS HEAD SCREW
ATTRIBUTES:     1, 4, .5

FIGURE 7

THE ISL RECORD STRUCTURE

LEVEL NUMBER | INSTANCE NAME | TYPE NAME | ATTRIBUTES

*FIGURE 8A*

*TYPE DATA STORE EXAMPLES*

TYPE NAME: SCOPE
    DESCRIPTION: INSTANCE NAME REFLECTS PRODUCT PRODUCED BY HK&M, INC.
    ATTRIBUTES: NONE

TYPE NAME: CONTRACT
    DESCRIPTION: INSTANCE NAME REFLECTS DOCUMENT NUMBER OF PURCHASE CONTRACT
    ATTRIBUTES: FILENAME OF DOCUMENT

TYPE NAME: WORKORDR
    DESCRIPTION: INSTANCE NAME REFLECTS WORK ORDER NUMBER GENERATED BY CONTRACT
    ATTRIBUTES: NONE

TYPE NAME: DESGNDOC
    DESCRIPTION: INSTANCE NAME REFLECTS FORMAL DESIGN SPECS OF HK&M, INC. PRODUCT
    ATTRIBUTES: FILENAME OF DOCUMENT

TYPE NAME: QAREVDOC
    DESCRIPTION: INSTANCE NAME REFLECTS DOCUMENT NUMBER OF QA REVIEW OF DESIGN SPECIFICATIONS
    ATTRIBUTES: FILENAME OF DOCUMENT

FIGURE 8B

TYPE DATA STORE EXAMPLES

| | |
|---|---|
| TYPE NAME: | DEPTPROC |
| DESCRIPTION: | INSTANCE NAME REFLECTS FILE NAME CONTAINING DEPARTMENTAL PROCEDURES DOCUMENT |
| ATTRIBUTES: | FILENAME OF DOCUMENT |
| | |
| TYPE NAME: | VPN |
| DESCRIPTION: | INSTANCE NAME REFLECTS DESIGN SPECIFICATION PART ITEM TO BE PURCHASED TO BUILD HK&M PRODUCT |
| ATTRIBUTES: | VENDOR PART NUMBER, COMPANY NAME OF VENDOR |
| | |
| TYPE NAME: | PCKGDES |
| DESCRIPTION: | DOCUMENT NUMBER OF PACKAGING DESIGN |
| ATTRIBUTES: | FILENAME OF DOCUMENT |
| | |
| TYPE NAME: | MACHOPS |
| DESCRIPTION: | INSTANCE NAME REFLECTS FOLDER NUMBER CONTAINING PROCEDURES FOR USING SPECIFIC MACHINE |
| ATTRIBUTES: | CABINET NUMBER WHERE FOLDER IS STORED |
| | |
| TYPE NAME: | FLLAYOUT |
| DESCRIPTION: | INSTANCE NAME REFLECTS DOCUMENT DESCRIBING SHOP FLOOR LAYOUT |
| ATTRIBUTES: | FILENAME OF DOCUMENT |

FIGURE 9A

INSTANCE DATA
STORE EXAMPLES

| | |
|---|---|
| INSTANCE NAME: | BR549 |
| TYPE NAME: | SCOPE |
| USAGE: | BACHELOR PARTY INVITATION GREETING CARD WHICH PLAYS "TAPS" WHEN OPENED |
| ATTRIBUTES: | NONE |

| | |
|---|---|
| INSTANCE NAME: | NCC1071 |
| TYPE NAME: | CONTRACT |
| USAGE: | CONTRACT FOR XYZ CORP. TO PURCHASE BR549'S |
| ATTRIBUTES: | C:\DATA\CONTRACT\NCC1701.CON |

| | |
|---|---|
| INSTANCE NAME: | X9401 |
| TYPE NAME: | WORKORDR |
| USAGE: | WORK ORDER TO BUILD BR549'S FOR XYZ CORP. |
| ATTRIBUTES: | NONE |

| | |
|---|---|
| INSTANCE NAME: | DRVX49 |
| TYPE NAME: | DESGNDOC |
| USAGE: | FORMAL DESIGN OF BR549'S AS PER NCC1701 CONTRACT |
| ATTRIBUTES: | C:\DATA\DESIGN\DRVX49.DES |

FIGURE 9B

*INSTANCE DATA STORE EXAMPLES*

| | |
|---|---|
| INSTANCE NAME: | DQ73B6 |
| TYPE NAME: | QAREVDOC |
| USAGE: | QA REVIEW OF DRVX49 DESGDOC |
| ATTRIBUTES: | C:\DATA\QA\DQ73B6.QAR |

| | |
|---|---|
| INSTANCE NAME: | PURCHASE |
| TYPE NAME: | DEPTPROC |
| USAGE: | WORK PROCEDURES FOR PURCHASING DEPARTMENT |
| ATTRIBUTES: | C:\PROC\PURCHASE\OPMANUAL.DPT |

| | |
|---|---|
| INSTANCE NAME: | GLUE |
| TYPE NAME: | VPN |
| USAGE: | VENDOR PART NUMBER PURCHASED FOR NCC1701 CONTRACT |
| ATTRIBUTES: | Q478X; ABC CORP. |

| | |
|---|---|
| INSTANCE NAME: | CARD |
| TYPE NAME: | VPN |
| USAGE: | VENDOR PART NUMBER PURCHASED FOR NCC1701 CONTRACT |
| ATTRIBUTES: | 8FGD4; BCD CORP. |

| | |
|---|---|
| INSTANCE NAME: | SPRING |
| TYPE NAME: | VPN |
| USAGE: | VENDOR PART NUMBER PURCHASED FOR NCC1701 CONTRACT |
| ATTRIBUTES: | PSWS6; CDE CORP. |

DIAGNOSTIC METHOD AND APPARATUS FOR CONFIGURATION ERRORS

TECHNICAL FIELD

This invention relates generally to a data processing system for processing a multi-level, hierarchical, bill of material component data file for diagnosing the criticality of errors that occur in the product represented by the bill of material and predicting the effect of changes upon the entire product.

BACKGROUND ART

Bills of material have been used to define product structures which consist of end products, assemblies, subassemblies, and component parts. Project networks which define the organization of a series of steps toward manufacturing a product have been also arranged in such bills of material. The bill of material arrangement of data is utilized for production and inventory control, cost accounting and the implementation of engineering changes. Bill of material data, representing a product structure for an end product or project network, are commonly stored in a computer database for automated processing.

To assist in engineering and production planning, and subsequent ongoing processing toward optimizing the product, producers apply metrics to the logical, physical and operational components of their products. Desirably, metrics are used to identify those product variations which are most critical because they produce errors or problems that most adversely effect the product or the producer's ability to develop, produce and maintain the product. Existing prior art which addresses this producibility falls into three areas: statistical process control; process improvement methods; and configuration management (CM). Statistical process control is a mathematical discipline used for finding the probability of any event producing a metric between desired parameters. Process improvement typically produces statistical measurement and a feedback into a process in order to make it self-improving. Configuration management is used to identify and control changes to physical components, the logical relationship and/or operational aspects of a system to which uncontrolled change is detrimental.

In configuration management components of a product are called configuration items (CI). Conventional configuration management provides control and reporting methodologies for changing configuration items and their interrelationships to improve overall project management.

The prior art has shown a variety of systems for processing a hierarchical bill of material. These include U.S. Pat. Nos. 5,197,001 and 5,210,686. Similarly, U.S. Pat. No. 4,591,983 illustrates the processing of a hierarchical knowledge base. U.S. Pat. No. 5,210,686 shows a diagnostic system involving configuration management.

However, in the past the determination of the criticality of an error and resulting change in the bill of material has usually been confined to a human intellectual analysis of abstract concepts. This human intensive evaluation process had to be repeated for each error and consequent change.

It is an object and feature of the present invention to permit the automated machine processing of the bill of material data file to determine multiple, quantitative measurements or metrics of an error and its consequent correction by machine processing in order to distinguish the relatively few and more critical errors from the more numerous and less critical errors and to predict the effect of each error, relative to the effect of other errors, upon the entire structure represented by the bill of material.

BRIEF DISCLOSURE OF INVENTION

A hierarchical bill of material component data file is stored in an information processing system, having a processor, a memory, a nonvolatile storage device, and user interface apparatus. The hierarchial bill of material component data in the file defines occurrences of component configuration items of a product with a plurality of levels. Each occurrence of each configuration item has a stored level code as one of its attributes. The occurrences of the configuration items with their associated level codes are arranged in the hierarchical arrangement in increasing detail and numerically higher code in proceeding from the most generic parent occurrence of a configuration item at the highest level in the product structure to the most detailed lowest level occurrence of a configuration item in the product structure.

In practicing the present invention, an occurrence of a failed configuration item included in the component data file is identified as the item which actually failed and is stored in memory. The level code of the failed configuration item is retrieved and stored. An occurrence of an effecting configuration item, is also identified and stored in memory. The effecting configuration item is the configuration item at the highest level differential from the failed configuration item which influenced the error and therefore must be changed as part of the correction of the error. It is a parent to all the configuration items which must be changed as part of the correction of the problem. The level code of the stored occurrence of the effecting configuration item is then retrieved and stored in memory. Then the level code of the occurrence of the failed configuration item and the level code of the occurrence of the effecting configuration item are differenced and that difference is stored as an initial error value and represents the magnitude of the criticality of the particular failure which is being diagnosed.

The invention further includes, subsequent to performance of the above steps, storing a list of all occurrences of configuration items which are to be altered as part of a correction of the failed configuration item. The level code for each such occurrence is retrieved and differenced with the level code for the occurrence of the effecting configuration item. The largest resulting level code difference is then stored as a side effect error value. The side effect error value represents the magnitude of the side effect of the correction of the failure and represents a lack of modularity in the product.

After performing all of the prior steps, the stored side effect error value and the stored initial error value are summed and stored as a total event error value. The total event error value represents the magnitude of the total negative impact upon the producer's ability to develop, produce and maintain the product and provides yet another metric for use in planning, production and maintenance of the product.

BRIEF DESCRIPTION OF DRAWINGS

FIGS. 4A–4D are an indented structure list.

FIG. 5 is a type data store.

FIG. 6 is a instance data store.

FIG. 7 is representative of the record structure of an indented structure list.

FIGS. 8A and 8B are detailed examples of a portion of a type data store.

FIGS. 9A and 9B are detailed examples of a portion of an instance data store.

Figures 1, 2:
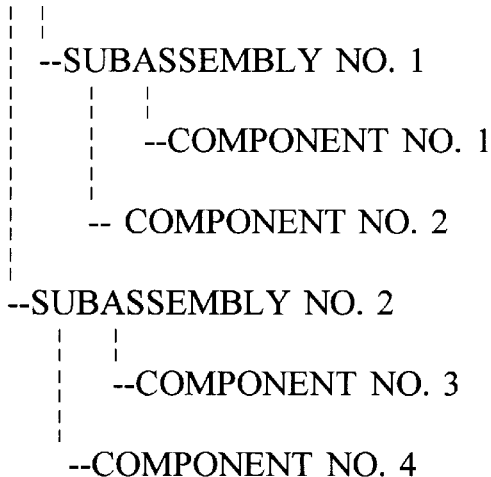
FIG. 1 is a graphical illustration of a bill of material.
FIG. 2 is an indented drawing list.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Configuration management is a prior art concept in which components of a product, such as a structure or process, are organized in a map showing the relationship and interdependence of the components. Configuration management utilizes the concept of a baseline. A baseline is a map of the product at a specific instant of time. Within the configuration control process, proposed changes in the product and consequent changes to the baseline map are reviewed by management before being implemented in order to determine their impact. If the changes are approved, they are implemented and a new baseline is then generated by modifying the preceding map to reflect those changes. This new baseline then becomes the map which serves as the base for subsequent change.

Figure 3:
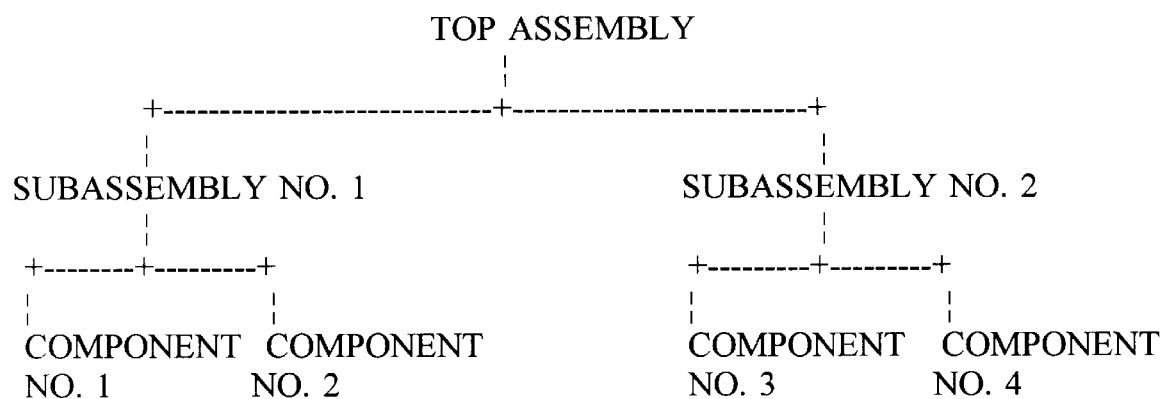
FIG. 3 is a graphical illustration of bill of material data represented by a tree.

Many mapping systems exist for mapping component interrelationships. The data defining the map and defining the interrelationships of the components may be physically represented in several ways, including as a bill of material as shown in FIG. 1, an indented drawing list as shown in FIG. 2, or as a tree as illustrated in FIG. 3. It may also be represented as an indented structure list (ISL) as illustrated in FIGS. 4A–4D. The data is essentially the same, it is just capable of these various physical illustrations or representations and may also be represented as networks or other graphical data structures. The data is referred to as bill of material data and is not dependent upon any particular physical representation of it. The data represents the hierarchical organizational relationships of the components and is typically stored in a component data file.

The present invention preferably uses three data structures to map the hierarchial relationships of the occurrences of configuration items as components of the product. The first is the type data store illustrated in FIG. 5. The type data store is used to group or classify configuration items by their common attributes. The second data store is the instance data store which is used to instantiate configuration items within a specific type and to define the attribute values for the attributes making up the type definition. The type and instance data stores provide a unique designation for identifying or naming each configuration item. The third data store is the indented structure list which is used to map the interrelationships between individual configuration items which are themselves defined by the type and instance data stores.

FIG. 4 shows a hierarchy of component configuration items and illustrates the levels of indenture assigned to each configuration item. The lower the level of a configuration item within the hierarchy, the higher the level of indenture and therefore the higher the level code. Thus, the top component in the hierarchy has a level of zero, since it represents zero levels of indenture from the top. The levels immediately below the top have an indenture level of one, and increasingly lower levels have increasingly higher corresponding level codes.

A particular configuration item may occur at multiple, different locations within the hierarchy because multiple replications of the same item may be needed for different components of the product. For example, multiple replications of a particular bolt may be used in different locations in the product. Consequently, there may be multiple occurrences of the same configuration item. The result is that a hierarchical bill of material component data file is created which defines occurrences of component configuration items of a product structure with a plurality of levels. Each occurrence of each configuration item has a stored level code. The occurrences and associated level codes are arranged in increasing detail and numerically higher code in proceeding from the most generic parent occurrence of a configuration item at the highest level in the product structure hierarchy to the most detailed, lowest level occurrence of a configuration item in the product structure.

When a product failure occurs and before implementing the method of the present invention, the existing baseline indented structure list is first analyzed to determine whether a lack of clear and/or complete and/or correct indented structure list definitions contributed to the failure. All occurrences of all configuration items which contributed to the failure and therefore must be changed to correct the failure are determined. The occurrence of the configuration item which actually failed is also identified and that configuration item is termed the "Failing Configuration Item" (FCI).

The indented structure list is also analyzed to identify an Effecting Configuration Item (ECI). The effecting configuration item is the occurrence of a configuration item at the highest level which has attributes or relationship definitions which influenced the failure and therefore must be altered as a part of the correction. The person analyzing the indented structure list chooses the configuration item at the highest level, which is a parent to all other configuration items which must be changed as part of the correction of the failure because it also influenced the failure. All other occurrences of configuration items which must be changed are children of the "Effecting Configuration Item" (ECI).

In order to practice the present invention following the above analysis, the bill of material component data file must first be stored in an information processing system of the type having a processor, a memory, a nonvolatile storage device, and a user interface. The occurrence of the failed configuration item is then stored in memory and the level code for that occurrence of the failed configuration item is retrieved and stored. The occurrence of the effecting configuration item is also stored in memory and its level code is retrieved and stored. These two level codes are differenced and the resulting difference is stored as an Initial Error Value (IEV). This Initial Error Value (IEV) may be used for subsequent calculations, graphed or plotted or used for further analysis. It represents the level difference between the failing configuration item (FCI) and the effecting configuration item (ECI) and represents the magnitude of the failure in the product.

Based upon the previously described analysis to identify all occurrences of configuration items which contributed to the failure and therefore must be changed, a list of all configuration items which are to be altered as part of a correction of the failed configuration item is then stored in memory. The level code for each such configuration item in that list is then retrieved and differenced with the level code for the occurrence of the effecting configuration item (ECI). From all the differenced level codes, the largest level code difference resulting from completion of the preceding step is then stored as a side effect error value (SEEV). The side effect error value (SEEV) is the magnitude of the side effects of the correction of the failure.

Finally, the stored side effect error value (SEEV) and the stored initial error value (IEV) are summed and stored as a total event error value (TEEV). The total event error value represents yet another metric representing the magnitude of the failure and its correction, and thereby represents the total negative impact upon the producer's ability to develop, produce and maintain the product.

Therefore, as each failure is encountered, analyzed and corrected, a new set of initial error value (IEV), side effect error value (SEEV), and total event error value (TEEV) is generated. A new indented structure list baseline is then implemented and the process repeats itself indefinitely as new failures are encountered. As IEV, SEEV, and TEEV metric populations are accumulated, statistical methodologies can be applied to establish confidence limits. If any failure produces IEV and/or SEEV and/or TEEV metrics outside of the confidence limits, a producer may create a special organizational body to investigate the combined interaction of the components where the most critical failures have occurred and the processes used to develop, produce and maintain a product.

For one or all of the three error values, IEV, SEEV, and TEEV, a confidence limit may be chosen and stored. The value of the confidence limit represents the degree of criticality which the producer considers to be sufficient that a failure exceeding the confidence limit should be called to the attention of management for review. In practicing the invention, each confidence limit value which has been stored in association with each of the three types of error values, is then compared to the associated error value itself. An alarm signal is then generated for each error value which exceeds its associated confidence limit. Such an alarm signal includes any of the well known alarm generating devices, as well as printing out information signalling that the alarm condition has occurred, and the particular error value with respect to which it has occurred. For example, a confidence limit of 10 may be chosen. In this example a confidence limit mass represent the detection and signalling of the most critical 5% of all errors. Confidence limits are chosen by management and can be very different from those in the example.

The invention may now be described in more detail and with a more specific example with reference to FIGS. 5–7.

The preferred embodiment of this invention defines groups of configuration items into types which have some significance to the producer. FIG. 5 shows an example of a type definition within the Type Data Store, which is preferably stored as a computer disk file (for speed of retrieval reasons). The Type Data Store consists of the Type Name, Usage, and Attributes fields. The Type Name field is used to identify the Type and must be unique to every other defined Type. The Usage field is an English description of the Type's usage within the organization and within the ISL. The Attributes field is used to specify the implementation differences of CI's within the same Type. For example, an automobile producer might group all Phillips-head screws used in the construction of an automobile into a Type called "PHLPSCRW", and determine that screw length, thread characteristics, and head size are significant common attributes.

The next step is to define instances of a Type. FIG. 6 is an example of an instance definition within the Instance Data Store, which is preferably stored as a computer disk file (for speed of retrieval reasons). The Instance data store consists of the Instance Name, Type Name, Usage and Attribute fields. The Instance Name field is used to define a unique name for every CI within the Type specified in the Type Name field. The Usage field is an English description of the Types usage within the organization and within the ISL. The Attribute field contains attribute values. For example, an automobile producer might use a particular instance of TYPE "PHLPSCRW", called "SHEETMTL", to join sheet metal panels together. This screw is 1 inch long, has 4 threads per inch, and has a 0.5 inch head.

By using Type and Instance names to provide unique CI nomenclatures, it is now possible to define relationships between CI's. FIG. 7 shows the general requirements for an Indented Structure List (ISL) data store, which is preferably stored as a computer disk file (for speed of retrieval reasons). The Indented Structure List (ISL) data store is used to map CI hierarchical relationships. The ISL consists of an indexed sequential file of variant records, although other file and record structures are possible. Each record contains the Level Number, Instance Name, Type Name and Attribute fields. The Level Number field is an integer representing the level of indenture. The Instance Name and Type Name fields together provide for unique nomenclature of every CI in the ISL. The Attribute field structure will vary based on the Type Name and the Values will vary upon the Instance Name.

The ISL, Type and Instance data stores form the baseline for the configuration management practices of a producer. Thus, when a product failure occurs, the failure is recorded, analyzed and corrected within the producers CM practices. With careful analysis of the failure, an individual CI can be identified as the failing component within the baseline ISL. This component is the Failing Configuration Item (FCI). There can only be one FCI due to the unique nomenclature of CI's. If the FCI failed as a result of the lack of clear, complete and/or concise ISL relationships and/or attributes, the baseline ISL is in error. Next, identify the CI where the lack of attribute/relation definition exists between it and the FCI. This is the Effecting Configuration Item (ECI). The ECI is always a parent node of the FCI because of attribute inheritance. Representing the magnitude of the failure, the Initial Error Value (IEV) is determined by finding the difference in levels of indenture. By using the level numbers of the ISL, the IEV is determined by differencing the level number of the ECI and the level number of the FCI.

A draft solution to correct the failure is prepared. It is standard practice to perform an impact analysis in order to predict the consequences of the solution's ripple-effect throughout the ISL. Since the ISL definitions and/or relationship definitions between the FCI and ECI are incorrect as defined, all occurrences of this interface must be identified and analyzed in order to properly devise a solution. Typically an impact analysis report consists of a list of CI's which must be changed in order to correct the ISL. The CI with the highest number of levels of indenture between itself and the ECI is termed the Highest-Effected Configuration Item (HECI). The ECI will always be a parent node of the HECI. The Side-Effect Error Value (SEEV) representing the lack of CI independence or modularity is determined by differencing the level number of the ECI and the level number of the HECI.

The Total Event Error Value (TEEV) representing the total impact upon producibility is determined by summing the IEV and SEEV.

Within the CM change control practices, once a solution is approved for implementation, the ISL is redefined and a new baseline ISL is created. This process repeats indefinitely.

EXAMPLES

HK&M, Inc. is a producer of musical greeting cards. HK&M acquires the completed greeting cards and musical parts, assembles them and ships finished cards to their customers retail outlets. In order to understand the following examples of how HK&M utilizes this invention, FIGS. 4A–4D, 8A, 8B, 9A and 9B must be explained in great detail. FIGS. 8A and 8B show some of the Type definitions used in the ISL shown in FIGS. 4A–4D. FIGS. 9A and 9B show some of the instance definitions used in the ISL shown in FIGS. 4A–4D. FIGS. 4A–4D is an ISL in its preferred printed textual format. Please note a new field, called Record Number. Since the ISL is an indexed-sequential file, this field is easily calculated without having to actually represent this information in the ISL data. Each line of the ISL shown in FIG. 4 is explained below.

HK&M produces a musical greeting card, product BR549, which is an invitation to a bachelor party which plays "TAPS' when opened. Line 1 reflects how HK&M uses the type SCOPE for the purpose of associating all HK&M activities associated with producing product BR549 into one ISL. Line 2 reflects how HK&M uses the type CONTRACT for the purpose of grouping all activities associated with specific sales contracts, in this example contract number NCC1071 in which XYZ Corp. has agreed to purchase BR549s from HK&M.

Once a sales contract is signed, the Sales Manager issues a work order allowing other HK&M departments to begin work to fulfill the contract. Line 3 reflects how HK&M uses the type WORKORDR for the purpose of grouping of work associated with fulfilling a specific contract by work order number. Once a work order is issued, a formal design is prepared by the Senior Engineer. Line 4 reflects how HK&M uses the type DESGNDOC for the purpose of grouping the approved contractual design document generated by a work order.

The design document is reviewed by the QA department, and Line 5 reflects how HK&M uses the type QAREVDOC for the purpose of grouping the quality assurance review document with the approved design document. Once the design is approved by QA, it is forwarded to the Purchasing department so that procurement of the material necessary can take place. (It is also forwarded to the Assembly department—see line 12.) Line 6 reflects how HK&M uses the type DEPTPROC for the purpose of grouping documents detailing the procedures used by the Purchasing department in order to implement the approved product design.

Lines 7 through 11 reflect how HK&M uses the type VPN (vendor part number) for the purpose of grouping information about vendors supplying raw materials that will be used in producing BR549's for delivery to XYZ Corp. The instance name reflects the parts specified in the approved design document. For example, Line 7 reflects that the glue used required by the design document is to be purchased is product number Q478X from the ABC Corp.

Once the design is approved by QA, it is forwarded to the Assembly department so that procurement of the material necessary can take place. (It is also forwarded to the Assembly department—see line 12.) Line 6 reflects how HK&M uses the type DEPTPROC for the purpose of grouping documents detailing the procedures used by the Purchasing department in order to implement the approved product design. Line 12 reflects how HK&M uses the type DEPTPROC for the purpose of grouping documents detailing the procedures used by the Assembly department in order to design packaging to ship the finished product (line 13) and a shop floor layout (line 18).

Line 13 reflects the packaging design document detailing how finished BR549s are to be packaged for shipping to XYZ Corp. The packaging design is forwarded to the Purchasing department so that procurement of the material necessary to package finished BR549's. Line 14 reflects the procedures followed by the Purchasing department in procurement of packaging materials. The lines 15 through 17 reflect how HK&M uses the type VPN (vendor part number) for the purpose of grouping information about vendors supplying raw materials that will be used in packaging BR549's for delivery to XYZ Corp. The instance name reflects the parts specified in the approved design document. For example, Line 16 reflects that the pallet used required by the packaging design document is to be purchased is product number HDH332 from the GHI Corp.

Figure 10:
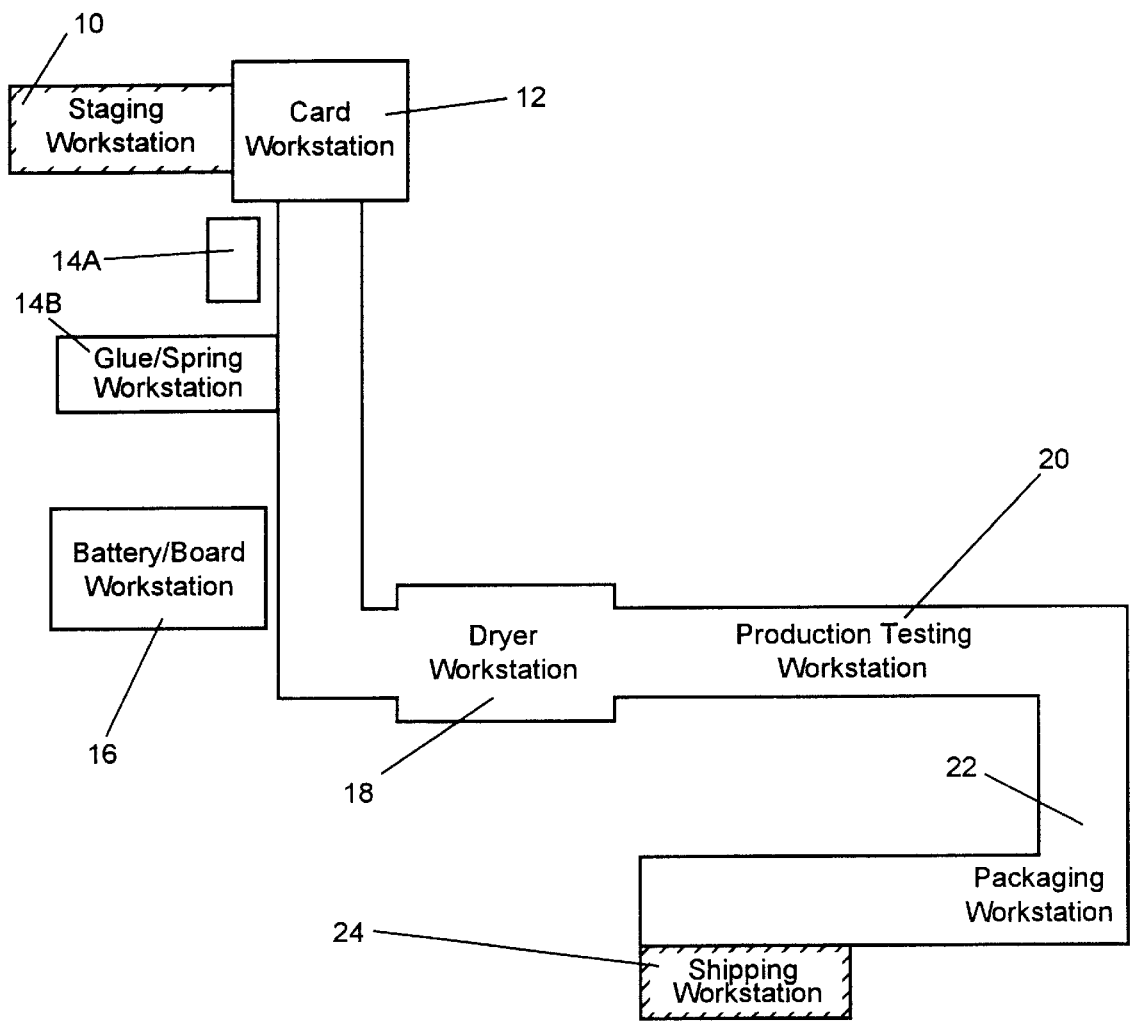
FIG. 10 is a diagrammatic plan view of a shop used in an example.
Figure 11:
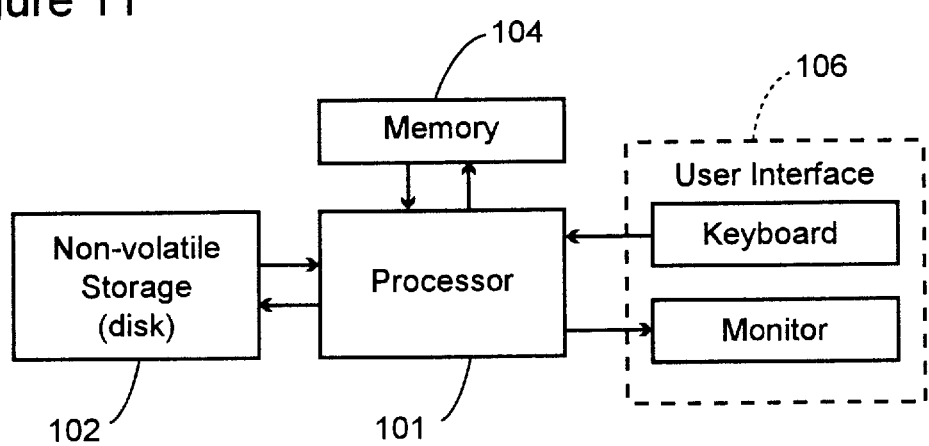
FIG. 11 is a block diagram illustrating a digital computer embodying the present invention.

When the Assembly department receives the QA-approved design document (line 5), a packaging design document (line 13) and a shop floor layout is created. Line 18 reflects how HK&M uses the type FLLAYOUT to represent the document created detailing the shop floor layout and workstations. FIG. 10 is used to graphically illustrate the floor layout document created. Note there are 8 workstations: a staging station 10 (line 19), a card station 12 (line 20), a glue/spring station 14A and 14B (line 23), a battery/board station 16 (line 29), a dryer station 18 (line 33), a testing station 20 (line 36), a packaging station 22 (line 41), and a storage station 24 (line 46).

Line 19 reflects how HK&M uses the type STGNGPRC to represent the document created to detail the procedures to be performed by the person assigned to work at the staging workstation. Line 20 reflects how HK&M uses the type CARDPROC to represent the document created to detail procedures followed by the person assigned to work at the card workstation. Line 21 reflects how HK&M uses the type MACHOPS to represent the file folder containing the user manual for the card machine (model number CHSH333). Line 22 reflects how HK&M uses the type CARDS to represent the cards to be fed into the card machine by the card workstation worker.

Line 23 reflects how HK&M uses the type GLUEPROC to represent the document created to detail procedures followed by the person assigned to work at the card workstation. Line 24 reflects how HK&M uses the type MACHOPS to represent the file folder containing the user manual for the glue machine (model number X47BB). Line 25 reflects how HK&M uses the type GLUE to represent the glue to be fed into the glue machine by the glue/spring workstation worker. Line 26 reflects how HK&M uses the type MACHOPS to represent the file folder containing the user manual for the spring machine (model number JSDJ3).

Line 27 reflects how HK&M uses the type SPRING to represent the spring to be loaded into the glue machine by the glue/spring workstation worker. The output of the glue/spring workstation is an assembly of the card with the spring glued into place. Line 28 reflects how HK&M uses the type SUBASSEM to represent sub-assemblies.

Line 29 reflects how HK&M uses the type B&BPROC to represent the document created to detail procedures followed by the person assigned to work at the battery/board workstation. Line 30 reflects how HK&M uses the type MACHOPS to represent the file folder containing the user manual for the machine which inserts the battery into the circuit board and places the board onto the card (model number GSGD11).

Line 31 reflects how HK&M uses the type SUBASSEM to represent sub-assemblies. This sub-assembly represents the glue/spring/card sub-assembly. Line 32 reflects how HK&M uses the type BATTERY to represent the battery to be inserted into the circuit board. Line 33 reflects how HK&M uses the type BOARD to represent the circuit board which will play the appropriate song. Line 34 reflects how HK&M uses the type SUBASSEM to represent sub-assemblies. This sub-assembly represents the glue/spring/card/battery/board sub-assembly.

Line 35 reflects how HK&M uses the type DRYRPROC to represent the document created to detail procedures followed by the person assigned to work at the dryer workstation. Line 36 reflects how HK&M uses the type MACHOPS to represent the file folder containing the user manual for the machine which heats the g battery into the circuit board and places the board onto the card (model number YY322). Line 37 reflects how HK&M uses the type SUBASSEM to represent sub-assemblies. This sub-assembly represents the glue/spring/card/battery/board sub-assembly.

Line 38 reflects how HK&M uses the type TESTPROC to represent the document created to detail procedures followed by the person assigned to work at the testing workstation. Line 39 reflects how HK&M uses the type QAREQS to represent the document detailing pass/fail criteria for final product testing before delivery to customer.

Line 40 reflects how HK&M uses the type SUBASSEM to represent sub-assemblies. This sub-assembly represents the glue/spring/card/battery/board sub-assembly. If a glue/spring/card/battery/board assembly passes the QA requirements it is considered to be of type PRODUCT as shown in line 41. If a glue/spring/card/battery/board assembly fails the QA requirements it is considered to be of type QAREJECT as shown in line 42. Line 43 reflects how HK&M uses the type PCKGPRC to represent the document created to detail procedures followed by the person assigned to work at the packaging workstation.

Line 44 reflects how HK&M uses the type MACHOPS to represent the file folder containing the user manual for the machine which places BR549s into shipping cartons (model number YHDD4). Line 45 represents the BR549s to be placed into the carton shown in line 46. Line 47 reflects how HK&M uses the type BOXED to represent finished product in its shipping carton. Line 48 reflects how HK&M uses the type SHIPPROC to represent the document created to detail procedures followed by the person assigned to work at the shipping workstation.

Line 49 represents the boxed cartons of BR549s to be loaded onto the pallets. Line 50, represents the pallets on which the boxed cartons of BR549s are to placed. Line 51 represents the shrink wrap to cover the boxes on the pallet. Line 52 reflects how HK&M uses type DELIVER to represent deliverable products ready for shipment to the customer.

FAILURE DETAILS

HK&M currently uses these values for confidence limits for the three error values:

Current IEV confidence limit: 7
Current SEEV confidence limit: 4
Current TEEV confidence limit: 11

The first failure to be explored was found by the person working at the testing workstation, who noted that every assembly tested did not work.

It was noted that the circuit boards had melted contacts and thus it was reasonable to assume that the dryer was at a temperature too high for the boards. Upon investigation, the dryer machine was operating at the temperature specified in the design document. The design document did not address this issue. Thus, the design document was designated the ECI. The resolution was to change the procedures used to create product designs. An appropriate change was also made to the QA review (line 5) and the dryer workstation procedures (line 33). The dryer workstation procedures was designated the HECI. This error produced no metrics outside of the current HK&M confidence limits.

To summarize:
FCI—line 40 level 9
ECI—line 4, level 3
HECI—line 35, level 7
IEV=6 (9-3)
SEEV=4 (7-3)
TEEV=10 (6+4)
   Noted failure: circuit board fails due to excessive heat used at dryer to cure glue;
   Failure Reason: design document did not test melting point of solder
   Solution: lower temp for longer time The second failure to be explored was found by the representatives of the XYZ Corp. who noted that the cards shipped to them were not playing "TAPS", but "HAPPY BIRTHDAY". Thus the FCI was the deliverable BR549s. Upon investigation, a typing error caused the wrong part to be ordered from the EFG Corp. The ECI was determined to be the procedures used by the Purchasing department. The procedures were changed to implement a review process before parts being ordered. The HECI was determined to be the procedures mentioned above. This error produced no metrics outside of the current HK&M confidence limits. To summarize:

FCI—line 52, level 9
ECI—line 6, level 5
HECI—line 6, level 5
IEV=4 (9-5)
SEEV=0 (5-5)
TEEV=4 (4+0)
   Noted failure: cards playing wrong song
   Failure Reason: typo error caused wrong parts to be ordered
   solution: change procedures to implement data review prior to parts being ordered The last error to be explored was discovered by the person working at the shipping workstation, who noticed that as they stacked the cartons onto the pallets, the cartons on the bottom were being crushed. The FCI was determined to be the cartons of BR549s. The procedures used by the Assembly department was determined to be the ECI, because no QA review was performed for the packaging design. Thus, the solution was twofold: 1) to add a new QA audit of the packaging design prior to allowing the Purchasing department to obtain cartons and 2) change the procedures for the shipping workstation. This first part of the solution requires that the ISL structure be changed, by inserting a new line between the existing lines 13 and 14. Thus, the ISL must be redefined.

This would effectively add 1 to the level of every child of the CI on line 13 in FIGS. 4A—4D. This would also increase the respective line numbers of every CI below the new line inserted as line 14. Thus, the HECI, line 47 in FIG. 9 would become line 48 in the new ISL. This error produces an SEEV metric that is above the current HK&M confidence limits. HK&M management would assemble a group of people for the various departments to review the structure of the ISL and to determine where the ISL has similar structural failure possibilities.

To summarize:

FCI—line 49, level 8

ECI—line 12 level 5

HECI—line 48 [line 47+1], level 10

IEV=3 (8−5)

SEEV=5 (10−5)

TEEV=8(3+5)

Noted failure: boxed cartons are crushed when stacked on pallets

Failure Reason: packaging design didn't address carton crush limits

Solution: reduce number of cards per carton

FIG. 11 illustrates a computer information processing system having a processor 101, a nonvolatile storage device 102, typically a hard disk, a memory 104, and a user interface apparatus 106.

While certain preferred embodiments of the present invention have been disclosed in detail, it is to be understood that various modifications may be adopted without departing from the spirit of the invention or scope of the following claims.

We claim:

1. A method for product configuration management in controlling the manufacture of a product structure formed by assembled, multiple component configuration items represented by data arranged in a hierarchical, bill of material stored in a computer information processing system having a processor, a memory, a nonvolatile storage device and user interface apparatus, the method comprising the steps in the computer information processing system:

(a) storing a hierarchical bill of material component data file defining and representing occurrences of and the arrangement of the assembled component configuration items of a product structure with a plurality of levels, each occurrence of each configuration item having a stored level code representing the assembled relationship of the item to other items in the assembled product structure, the occurrences and associated level codes being arranged in increasing detail and numerically higher code in proceeding from the most generic parent occurrence of a configuration item at the highest level in the product structure to the most detailed lowest level occurrence of a configuration item in the product structure;

(b) storing in memory an occurrence of a failed configuration item included in said component data file;

(c) retrieving and storing in memory the level code of the occurrence of the failed configuration item;

(d) storing in memory an occurrence of an effecting configuration item included in said component data file;

(e) retrieving and storing in memory the level code of the stored occurrence of the effecting configuration item;

(f) differencing the level code of the occurrence of the failed configuration item and the level code of the occurrence of the effecting configuration item;

(g) storing, as an initial error value, the level code difference from the preceding step;

(h) storing a selected initial error value confidence limit in association with said initial error value;

(i) comparing said initial error value confidence limit to its associated error value; and (j) signalling an alarm condition if said error value exceeds said associated confidence limit.

2. A method in accordance with claim 1 wherein the hierarchical bill of material component data file is arranged in an indented structure list.

3. A method for product configuration management in controlling the manufacture of a product structure formed by assembled, multiple component configuration items represented by data arranged in a hierarchical, bill of material stored in a computer information processing system having a processor, a memory, a nonvolatile storage device and user interface apparatus, the method comprising the steps in the computer information processing system:

(a) storing a hierarchical bill of material component data file defining and representing occurrences of and the arrangement of the assembled component configuration items of a product structure with a plurality of levels, each occurrence of each configuration item having a stored level code representing the assembled relationship of the item to other items in the assembled product structure, the occurrences and associated level codes being arranged in increasing detail and numerically higher code in proceeding from the most generic parent occurrence of a configuration item at the highest level in the product structure to the most detailed lowest level occurrence of a configuration item in the product structure;

(b) storing in memory an occurrence of a failed configuration item included in said component data file;

(c) retrieving and storing in memory the level code of the occurrence of the failed configuration item;

(d) storing in memory an occurrence of an effecting configuration item included in said component data file;

(e) retrieving and storing in memory the level code of the stored occurrence of the effecting configuration item;

(f) differencing the level code of the occurrence of the failed configuration item and the level code of the occurrence of the effecting configuration item;

(g) storing, as an initial error value, the level code difference from the preceding step;

(h) storing a list of all configuration items which are to be altered as part of a correction of the failed configuration item;

(i) retrieving and differencing the level code for each configuration item in the list of the preceding step and the level code for the occurrence of said effecting configuration item, (j) storing, as a side effect error value, the largest level code difference resulting from completion of the preceding step;

(k) storing a selected confidence limit in association with each error value;

(l) comparing each confidence limit to its associated error value; and (m) signalling an alarm condition for an error value which exceeds its associated confidence limit.

4. A method in accordance with claim 3 wherein the hierarchical bill of material component data file is arranged in an indented structure list.

5. A method in accordance with claim 3 further comprising:
   summing the stored side effect error value with the stored initial error value and storing the sum as a total event error value.

6. A method in accordance with claim 5 wherein the hierarchical bill of material component data file is arranged in an indented structure list.

7. A method in accordance with claim 1 or claim 3 or claim 5 further comprising: signalling an alarm condition for each error value which exceeds its associated confidence limit.

8. A diagnostic apparatus for detecting and displaying the magnitude of a failure of a component of a product for use in product configuration management in controlling the manufacture of a product structure formed by assembled, multiple component configuration items represented by data arranged in a hierarchical bill of material stored in a computer information processing system having a processor, a memory, a nonvolatile storage device and user interface apparatus, the apparatus comprising:

(a) means for storing a hierarchical bill of material component data file defining and representing occurrences of and the arrangement of the assembled component configuration items of a product structure with a plurality of levels, each occurrence of each configuration item having a stored level code representing the assembled relationship of the item to other items in the assembled product structure, the occurrences and associated level codes being arranged in increasing detail and numerically higher code in proceeding from the most generic parent occurrence of a configuration item at the highest level in the product structure to the most detailed lowest level occurrence of a configuration item in the product structure;

(b) means for storing in memory an occurrence of a failed configuration item;

(c) means for retrieving and storing in memory the level code of the occurrence of a failed configuration item;

(d) means for storing in memory an occurrence of an effecting configuration item;

(e) means for retrieving and storing in memory the level code of the stored occurrence of the effecting configuration item;

(f) means for differencing the level code of the occurrence of the failed configuration item and the level code of the occurrence of the effecting configuration item; and (g) means for storing in memory, as an initial error value, the level code difference of the level code of the occurrence of the failed configuration item and the level code of the occurrence of the effecting configuration item;

(h) means for storing a selected initial error value confidence limit in association with said initial error value;

(i) means for comparing said initial error value confidence limit to its associated error value; and (j) means for signalling an alarm condition if said error value exceeds said associated confidence limit.

9. A apparatus in accordance with claim 8 wherein the hierarchical bill of material component data file is arranged in an indented structure list.

10. An apparatus in accordance with claim 8 and further comprising;

(a) means for storing in memory a list of all occurrences of all configuration items which are to be altered as part of a correction of the failed configuration item;

(b) means for traversing the hierarchical bill of material data file downwardly to lower levels from the stored occurrence of the effecting configuration item through every occurrence of every subservient configuration item at a lower level than the occurrence of the effecting configuration item and while traversing, (i) comparing each encountered occurrence of each configuration item to the list from step (a) and, for each encountered occurrence which is on the list, differencing the level code of the encountered occurrence and the level code for the occurrence of the effecting configuration item, and (ii) storing the level difference from the preceding step if it exceeds the level difference from a previous performance of the preceding step; and (c) means for storing, as a side effect error value, the remaining level code difference resulting from completion of the preceding step.

11. An apparatus in accordance with claim 10 wherein the hierarchical bill of material component data file is arranged in an indented structure list.

12. An apparatus in accordance with claim 10 and further comprising:
    means for summing the stored side effect error value with the stored initial error value and for storing in memory the sum as a total event error value.

13. An apparatus in accordance with claim 12 wherein the hierarchical bill of material component data file is arranged in an indented structure list.

* * * * *